United States Patent
Hecht et al.

(10) Patent No.: US 8,968,147 B2
(45) Date of Patent: *Mar. 3, 2015

(54) SWITCHABLE GEAR IN A HANDHELD POWER TOOL

(71) Applicant: Robert Bosch GmbH, Stuttgart (DE)

(72) Inventors: Joachim Hecht, Magstadt (DE); Heiko Roehm, Stuttgart (DE); Martin Kraus, Filderstadt (DE); Dietmar Saur, Gomaringen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,559

(22) Filed: Jun. 17, 2013

(65) Prior Publication Data

US 2013/0276565 A1 Oct. 24, 2013

Related U.S. Application Data

(63) Continuation of application No. 13/061,490, filed as application No. PCT/EP2009/058998 on Jul. 14, 2009, now Pat. No. 8,485,935.

(30) Foreign Application Priority Data

Aug. 27, 2008 (DE) .......................... 10 2008 041 599

(51) Int. Cl.
*F16H 3/44* (2006.01)
*F16H 3/02* (2006.01)
*B25B 21/00* (2006.01)
*B25B 23/14* (2006.01)
*B25F 5/00* (2006.01)

(52) U.S. Cl.
CPC *F16H 3/02* (2013.01); *B25B 21/00* (2013.01); *B25B 21/008* (2013.01); *B25B 23/141* (2013.01); *B25F 5/001* (2013.01)
USPC .......................................................... 475/299

(58) Field of Classification Search
CPC .................................. F16H 3/002; F16H 3/44
USPC .................................................... 475/299, 317
See application file for complete search history.

(56) References Cited

U.S. PATENT DOCUMENTS

| 5,458,206 A | 10/1995 | Bourner et al. |
| 6,796,921 B1 * | 9/2004 | Buck et al. ..................... 475/299 |

(Continued)

FOREIGN PATENT DOCUMENTS

| DE | 69 400 262 | 1/1997 |
| DE | 1 030 2114 | 8/2003 |

(Continued)

OTHER PUBLICATIONS

International Search Report for PCT/EP2009/058998, dated Oct. 13, 2009.

*Primary Examiner* — Edwin A Young
(74) *Attorney, Agent, or Firm* — Kenyon & Kenyon LLP

(57) ABSTRACT

A switchable gear in a handheld power tool has at least two gear stages which are to be engaged via an adjustable switching member, the switching member being in a latched position via a retaining element fixedly held against a housing in a first gear stage. Furthermore, a spindle for receiving a tool may be driven via an axially spring-loaded gear wheel, the gear wheel being axially supported on the retaining element on the side opposite the switching member.

20 Claims, 3 Drawing Sheets

(56) References Cited

U.S. PATENT DOCUMENTS

| | | |
|---|---|---|
| 7,537,064 B2 | 5/2009 | Milbourne et al. |
| 7,537,540 B2 | 5/2009 | Baumann et al. |
| 8,485,935 B2 * | 7/2013 | Hecht et al. ............ 475/299 |
| 2005/0215385 A1 | 9/2005 | Spielmann et al. |
| 2005/0224243 A1 | 10/2005 | Baumann et al. |
| 2008/0032848 A1 | 2/2008 | Ho |
| 2009/0020301 A1 | 1/2009 | Aeberhard |

FOREIGN PATENT DOCUMENTS

| | | |
|---|---|---|
| DE | 102004011617 | 9/2005 |
| DE | 10 2004058809 | 6/2006 |
| EP | 0 787 931 | 8/1997 |
| EP | 1 787 757 | 5/2007 |
| EP | 1 857 228 | 11/2007 |
| EP | 1 946 895 | 7/2008 |
| EP | 2 508 302 | 10/2012 |

* cited by examiner

SWITCHABLE GEAR IN A HANDHELD POWER TOOL

CROSS-REFERENCE TO RELATED APPLICATIONS

The present application is a continuation application of U.S. patent application Ser. No. 13/061,490, filed on May 11, 2011, which is a national phase to International Application No. PCT/EP2009/058998, filed Jul. 14, 2009, and claims priority to German Patent Application No. 10 2008 041 599.5, filed on Aug. 27, 2008, all of which are hereby incorporated by reference in their entireties.

FIELD OF THE INVENTION

The present invention relates to a switchable gear in a handheld power tool.

BACKGROUND INFORMATION

German Published Patent Application No. 10 2004 058 809 describes a handheld power tool designed as a cordless screwdriver, which has an electric drive motor which drives a tool receptacle via a multistage planet gear, the tool receptacle being designed to receive a tool. The handheld power tool is equipped with a torque limiter which assumes the function of the torque clutch to interrupt the flow of force between the motor output and the tool receptacle in the event that the transmitted torque exceeds the set value. The torque limiter includes spring elements which apply force to an annulus wheel of the planet gear and secure the annulus wheel fixedly to a housing during normal operation in which a torque is transmitted to the tool carrier. When the torque on the tool carrier reaches the set maximum torque, the rotationally fixed connection between the annulus wheel and the housing is interrupted and thus also the transmission of torque to the tool carrier.

Planet gears such as the one illustrated in German Published Patent Application No. 10 2004 058 809 may usually be switched between two gear stages having a slow rotational speed and a high torque or having a higher rotational speed and a lower torque. In selecting the gear, a slide switch manually adjusts an annulus wheel between a latched position having a housing latching component and an unlatched position, the latched position and the unlatched position each corresponding to one gear stage.

SUMMARY

Example embodiments of the present invention provide a compact switchable gear in a handheld power tool.

The switchable gear in a handheld power tool has at least two gear stages between which it is possible to switch, each gear stage being assigned a particular gear ratio between the electric drive motor and a spindle for receiving the tool, as well as a particular torque. In one gear stage, a switching member via which the gear stages are engaged is held in a latched position via a retaining element held fixedly against a housing such that the switching member is also fixedly secured to the housing via the retaining element. In the second gear stage, on the other hand, the switching member is in an unlatched position via the retaining element and may therefore execute a rotational movement relative to the housing.

To limit torque, at least one spring element, which applies a load axially to a gear wheel of the gear supported in the housing, is provided in the transmission path between the gear and the spindle for receiving the tool. A more or less high torque is transmitted to the spindle as a function of the load application.

According to example embodiments of the present invention, it is provided that the gear wheel is axially supported on the side opposite the switching member. The retaining element is thus assigned two functions. On the one hand, the retaining element is used to bring the switching member for switching between the gear stages of the gear into a latched position in which the switching member is fixedly locked to the housing. On the other hand, the retaining element has a supporting function for the gear wheel, which is supported in an axially loaded manner on the retaining element by the force of the spring element. Due to this dual function, at least one component, which is additionally present in certain conventional arrangements, may be dispensed with, which also achieves a more compact design, in particular in the axial direction of the gear train, in addition to reducing the number of components required. In addition to reducing the axial length, a simplification of the housing of the handheld power tool is also achieved, since only one receiving device must be provided in the housing for locking the retaining element.

In example embodiments, the retaining element is designed as a retaining ring which rests against the inside of the housing, it being possible to situate further gear components in the interior of the retaining ring without the components hindering each other or their functions being limited. The retaining ring preferably has positive-fit elements on the inside which form a positive fit with the switching member in the latched position. The positive-fit elements extend inward in the radial direction and allow axial insertion of the complementarily designed positive-fit elements on the switching member, so that the switching member may be adjusted between the latched or positive-fit position and the unlatched position via axial displacement.

Furthermore, the retaining ring advantageously has latching elements which project radially from the outside and are used to bring the retaining ring into an axial latched position with the housing of the handheld power tool or the housing of the gear. The latching elements advantageously extend into latching recesses of a corresponding shape, which are introduced into the inner wall of the housing.

The gear is advantageously a planet gear, the switching member being preferably configured as an annulus wheel which is coupled with and rotates together with a planet-wheel carrier of the planet gear in the unlatched position and is decoupled from the planet-wheel carrier in the latched position and is fixedly locked to the housing due to the positive fit with the retaining ring. The gear wheel via which the torque is transmitted to the spindle on the output side, and to which force is axially applied by the at least one spring element, is preferably configured as an annulus gear wheel. The annulus gear wheel is supported in the axial direction on the end face of the retaining ring facing away from the annulus wheel.

DETAILED DESCRIPTION

Figure 1:
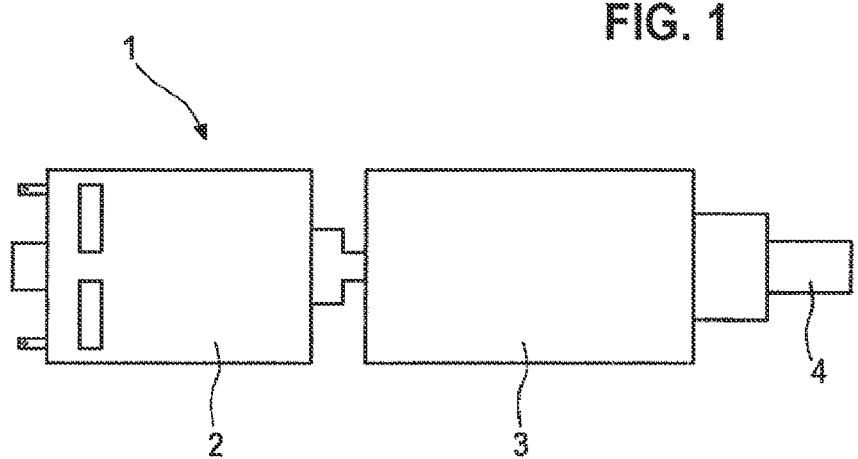
FIG. 1 shows a highly schematic representation of a handheld power tool having a gear train which includes the drive motor, gear and spindle for receiving a tool.

In the figures, identical components are provided with identical reference numerals.

FIG. 1 shows a highly schematic representation of an electric handheld power tool 1, for example a cordless drill or a cordless screwdriver, which includes an electric drive motor 2, a gear 3 and a spindle 4 which is driven by the gear and is used to receive a tool. The rotational speed of electric drive motor 2 is converted into a lower rotational speed of spindle 4 via gear 3. Gear 3 is preferably a planet gear which is switchable between two different gear stages having different transmission ratios and therefore different torque transmissions.

Figure 2:
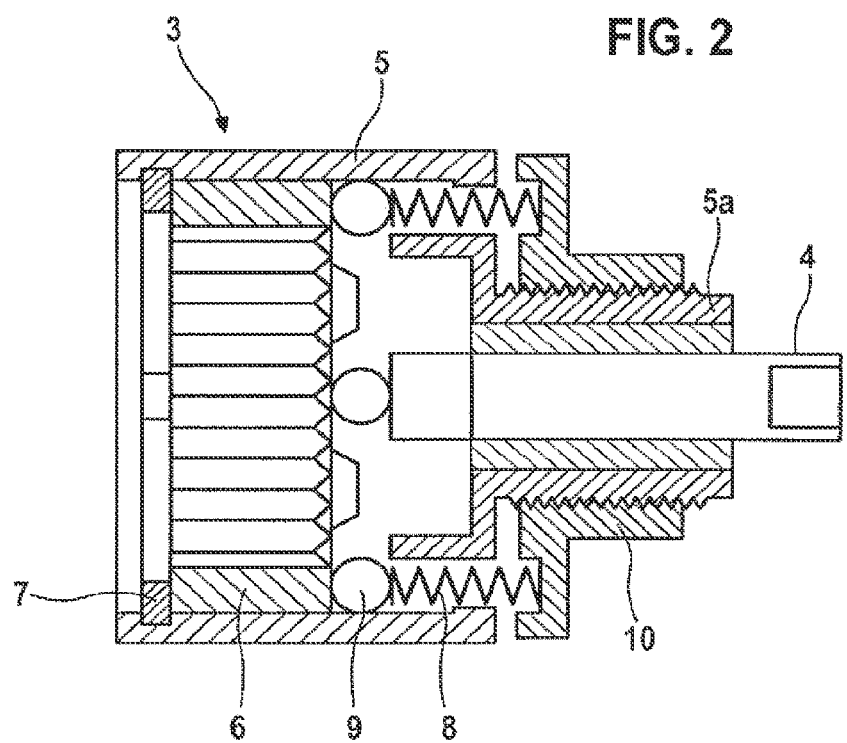
FIG. 2 shows a section of the handheld power tool in the area of the gear and the spindle driven by the gear.

FIG. 2 shows a part of gear 3 at the transition to spindle 4 in a sectional representation. In a housing 5 of the gear, which is simultaneously a component of the housing of the handheld power tool, an annulus gear wheel 6 is axially supported by a retaining ring 7 in the direction of the electric drive motor. On the side opposite retaining ring 7, force is axially applied to annulus gear wheel 6, which is axially movably mounted in housing 5 by a spring element 8 and blocking bodies 9 in the direction toward retaining ring 7. On the spindle side, the foot of spring element 8 is held in an axially adjustable manner on an adjusting ring 10 which is mounted on a housing section 5a and whose axial position is adjustable by rotating it relative to housing section 5a. For this purpose, adjusting ring 10 suitably has an inner thread which meshes with an outer thread on housing section 5a. Adjusting ring 10, spring element 8, including blocking body 9, and annulus gear wheel 6 form a torque clutch for limiting the maximum transmittable torque. Via the axial adjustment of adjusting ring 10, the foot of spring element 8, and thus the pretension of spring element 8, is adjusted, which makes it possible to influence the transmittable torque.

It may be advantageous to provide multiple spring elements, each having an assigned blocking body 9, distributed over the circumference. Blocking bodies 9 directly adjoin an axial end face of annulus gear wheel 6.

Retaining ring 7 is accommodated in housing 5 to form a positive fit. For this purpose, housing 5 has positive-fit recesses on its inside with which radially outward-projecting elements of retaining ring 7 engage, thereby fixedly connecting retaining ring 7 to housing 5 in both axial directions.

Figure 3:
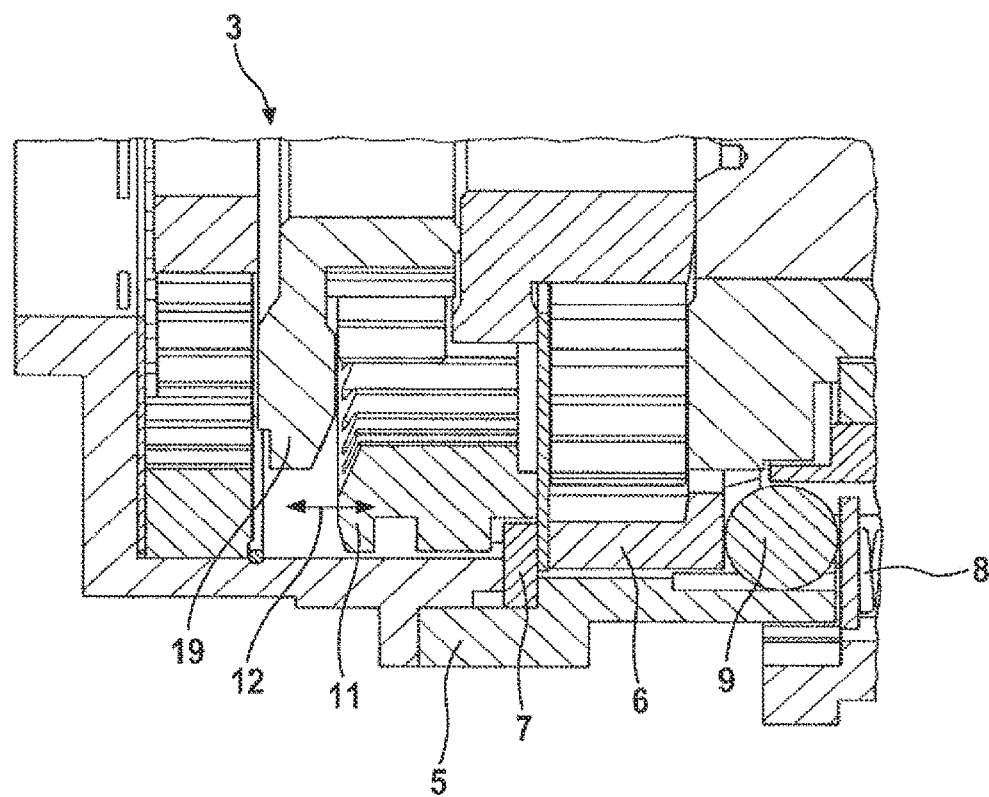
FIG. 3 shows a further sectional representation of the area of the gear, including a retaining ring on which an annulus gear wheel is supported in the axial direction and which is simultaneously in a latched position with an annulus wheel.

FIG. 3 shows a section of gear 3. Annulus gear wheel 6, which is axially supported on retaining ring 7, adjoins an end face of retaining ring 7 on the spindle side. Force is applied to annulus gear wheel 6 via spring element 8 and by blocking body 9 on retaining ring 7 in the axial direction.

An annulus wheel 11, which is axially movably mounted in housing 5, as indicated according to double arrow 12, and which is adjustable between the latched position shown in FIG. 3 with retaining ring 7 and an unlatched position located at an axial distance from retaining ring 7, is located on the opposite side facing the electric drive motor. The latched position of annulus wheel 11 via retaining ring 7, as well as the unlatched position, in which the positive fit to the housing is canceled but established with planet-wheel carrier 19, each represent gear stages of the gear for implementing a different gear and torque ratio. In the illustrated latched position, annulus wheel 11 is moved axially in the direction of retaining ring 7 until the end face of retaining ring 7 on the spindle side lies on a common plane with the end face of annulus wheel 11.

Figure 4:
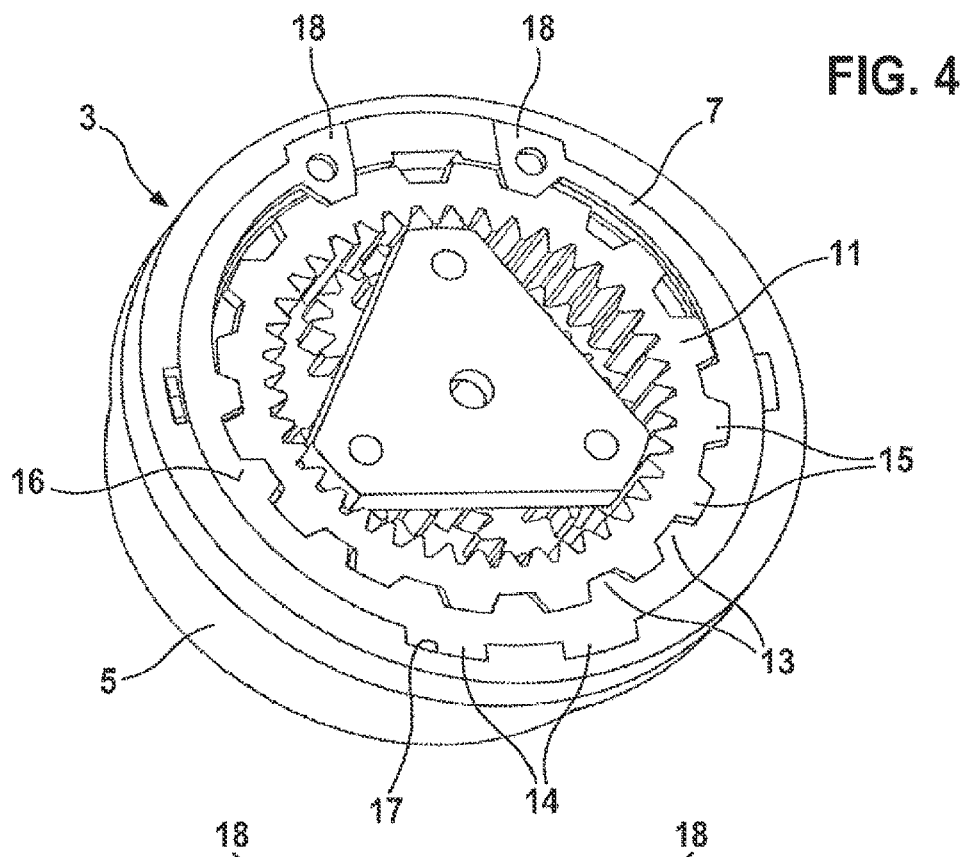
FIG. 4 shows a perspective view of the gear in the area of the retaining ring.

FIG. 4 shows a perspective view of gear 3 in the area of retaining ring 7. Annulus gear wheel 6 has positive-fit elements 15 on its outside, which are in the latched position via corresponding positive-fit elements 13 on retaining ring 7. Interlocking positive-fit elements 13 and 15 form a toothed structure which extends in the circumferential direction. The toothing permits axial introduction of annulus wheel 11 into tooth-shaped positive-fit elements 13 of retaining ring 7.

Annulus gear wheel 6 (FIG. 2, FIG. 3) is supported on axial end face 16 of retaining ring 7, which faces up in FIG. 4.

Radially raised latching elements 14, which project in a latching manner into corresponding recesses 17 on the inside of housing 5, are situated on the radial outside of retaining ring 7, thereby holding retaining ring 7 against housing 5 in a positive fit on the housing in the circumferential direction, i.e., the direction of rotation.

Figure 5:
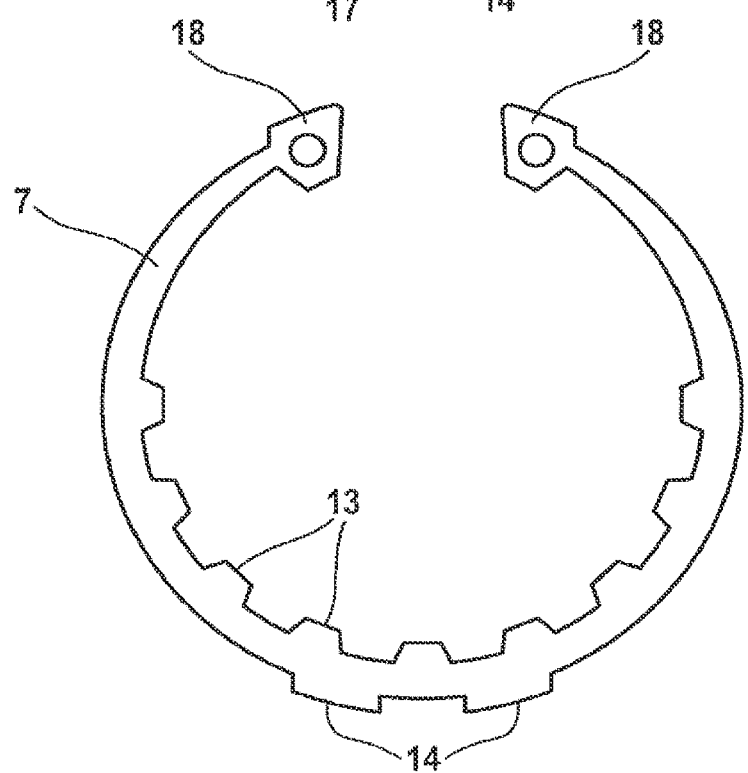
FIG. 5 shows an individual representation of the retaining ring.

As shown in the individual representation of retaining ring 7 according to FIG. 5, the retaining ring is designed to be not completely closed, but instead has an open angle segment of approximately 25°. Mounting eyes 18, which are used as mounting aids during assembly, are located on the free end faces of the retaining ring.

Positive-fit elements 13 on the inside of retaining ring 7, which are raised toward the inside in the radial direction, extend over an angle range of approximately 180°. Retaining ring 7, which is preferably designed as a metal ring, for example made of spring steel, has a cross section which tapers in the direction of the two retaining eyes 18. Accordingly, cross section 7 has its largest cross section on the side opposite the angle segment between retaining eyes 18, where latching elements 14, which are raised toward the outside in the radial direction on the outside of the retaining ring, are also situated. A total of only two such latching elements 14 are provided, while a plurality of positive-fit elements 13 is situated on the inside.

What is claimed is:

1. A handheld power tool comprising:
   a spindle adapted to receive a tool; and
   a switchable gear including at least two gear stages which are engaged via an adjustable switching member, the switching member being in a latched position via a retaining element in a first gear stage, and being in an unlatched position via the retaining element in a second gear stage;
   wherein the retaining element is fixedly held on a housing,
   wherein the retaining element is arranged as a retaining ring,
   wherein the retaining ring has positive-fit elements on an inside which have a positive fit with the switching member in the latched position,
   wherein the retaining ring has radially projecting latching elements on an outside, which are adapted to latch the retaining ring in the housing.

2. The handheld power tool according to claim 1, wherein the spindle is drivable by an axially spring-loaded gear wheel supported in the housing.

3. The handheld power tool according to claim 2, wherein the gear wheel is axially supported on the retaining element on a side opposite the switching member.

4. The handheld power tool according to claim 2, wherein the gear wheel is axially supported on an end face of the retaining element facing the tool.

5. The handheld power tool according to claim 2, wherein the gear wheel is arranged as an annulus gear wheel.

6. The handheld power tool according to claim 2, wherein a spring element is adapted to press at least one blocking body against an end face of the gear wheel.

7. The handheld power tool according to claim 2, wherein a foot of a spring element is adjustable on a side facing away from the gear wheel using an adjusting ring.

8. The handheld power tool according to claim 7, wherein the adjusting ring is adjustably held on the spindle.

9. The handheld power tool according to claim 1, wherein the housing is a housing of the gear.

10. The handheld power tool according to claim 1, wherein in the latched position an end face of the retaining element facing the tool lies on a common plane with an end face of the switching member facing the tool.

11. The handheld power tool according to claim 1, wherein the retaining ring has an open angle segment.

12. The handheld power tool according to claim 11, wherein on free ends of the retaining ring mounting eyes are located.

13. The handheld power tool according to claim 1, wherein the switching member is arranged as an annulus wheel.

14. The handheld power tool according to claim 1, wherein the gear is arranged as a planet gear.

15. A handheld power tool comprising:
a spindle adapted to receive a tool; and
a switchable gear including at least two gear stages which are engaged via an adjustable switching member, the switching member being in a latched position via a retaining element in a first gear stage, and being in an unlatched position via the retaining element in a second gear stage;
wherein the retaining element is fixedly held on a housing,
wherein the spindle is drivable by an axially spring-loaded gear wheel supported in the housing,
wherein the gear wheel is axially supported on the retaining element on a side opposite the switching member.

16. A handheld power tool comprising:
a spindle adapted to receive a tool; and
a switchable gear including at least two gear stages which are engaged via an adjustable switching member, the switching member being in a latched position via a retaining element in a first gear stage, and being in an unlatched position via the retaining element in a second gear stage;
wherein the retaining element is fixedly held on a housing,
wherein the spindle is drivable by an axially spring-loaded gear wheel supported in the housing,
wherein the gear wheel is axially supported on an end face of the retaining element facing the tool.

17. A handheld power tool comprising:
a spindle adapted to receive a tool; and
a switchable gear including at least two gear stages which are engaged via an adjustable switching member, the switching member being in a latched position via a retaining element in a first gear stage, and being in an unlatched position via the retaining element in a second gear stage;
wherein the retaining element is fixedly held on a housing,
wherein in the latched position an end face of the retaining element facing the tool lies on a common plane with an end face of the switching member facing the tool.

18. A handheld power tool comprising:
a spindle adapted to receive a tool; and
a switchable gear including at least two gear stages which are engaged via an adjustable switching member, the switching member being in a latched position via a retaining element in a first gear stage, and being in an unlatched position via the retaining element in a second gear stage;
wherein the retaining element is fixedly held on a housing,
wherein the retaining element is a retaining ring having an open angle segment,
wherein on free ends of the retaining ring mounting eyes are located.

19. A handheld power tool comprising;
a housing;
a drive motor;
a spindle adapted to receive a tool; and
a gear having an annulus gear wheel which is axially supported by a retaining ring in the direction of the drive motor;
on a side opposite the retaining ring, a force is axially applied to the annulus gear wheel in a direction toward the retaining ring by at least one spring element;
an adjusting element configured to adjust the force applied to the annulus gear by the at least one spring element such that the maximum torque transmitted from the annulus gear wheel to the spindle is limited;
wherein the retaining ring is fixedly held on a housing by radially outward-projecting elements which are adapted to engage positive-fit recesses on an inside of the housing.

20. A handheld power tool comprising:
a spindle adapted to receive a tool; and
a switchable gear including at least two gear stages which are engaged via an adjustable switching member, the switching member being in a latched position via a retaining element in a first gear stage, and being in an unlatched position via the retaining element in a second gear stage;
wherein the retaining element is held inside a housing,
wherein the retaining element is arranged as a retaining ring,
wherein the retaining ring has projecting elements which project on an inside of the retaining ring which are adapted to fit with the switching member in the latched position,
wherein the retaining ring has projecting latching elements which project on an outside of the retaining ring which are adapted to latch the retaining ring inside the housing.

* * * * *